W. E. BULLARD.
CARVING BOARD.
APPLICATION FILED AUG. 3, 1908.

943,767.

Patented Dec. 21, 1909.

Witnesses

Inventor
W. E. Bullard
By R. H. A. Lacey, Attorneys

UNITED STATES PATENT OFFICE.

WILL E. BULLARD, OF BELMOND, IOWA.

CARVING-BOARD.

943,767.   Specification of Letters Patent.   Patented Dec. 21, 1909.

Application filed August 3, 1908. Serial No. 446,660.

*To all whom it may concern:*

Be it known that I, WILL E. BULLARD, a citizen of the United States, residing at Belmond, in the county of Wright and State of Iowa, have invented certain new and useful Improvements in Carving-Boards, of which the following is a specification.

It is well known that during carving, the difficulty experienced in holding the meat or fowl firmly in position upon the ordinary platter, is one of the principal features which render carving disagreeable and tedious, since the meat is liable to slip and thus cause a ragged cut, or be spilt upon the table or the like.

The object of this invention is an improved carving board which is designed to hold the meat placed thereon firmly in position and thus expedite the carving and obviate the disadvantages above noted, and which may be readily adjusted to accommodate pieces of meat of different sizes.

With this and other objects in view that will more fully appear as the description proceeds, the invention consists in certain constructions and arrangements of the parts that I shall hereinafter fully describe and then point out the novel features thereof in the appended claim.

Figure 1:
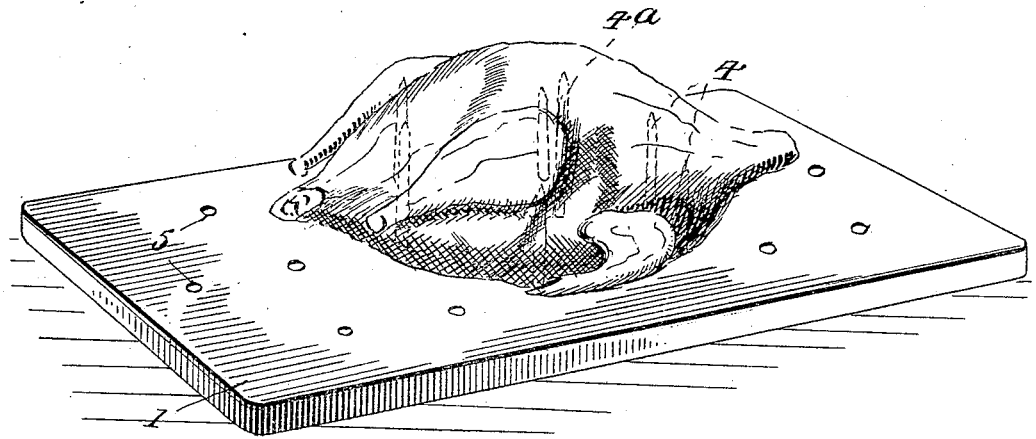
Figure 2:
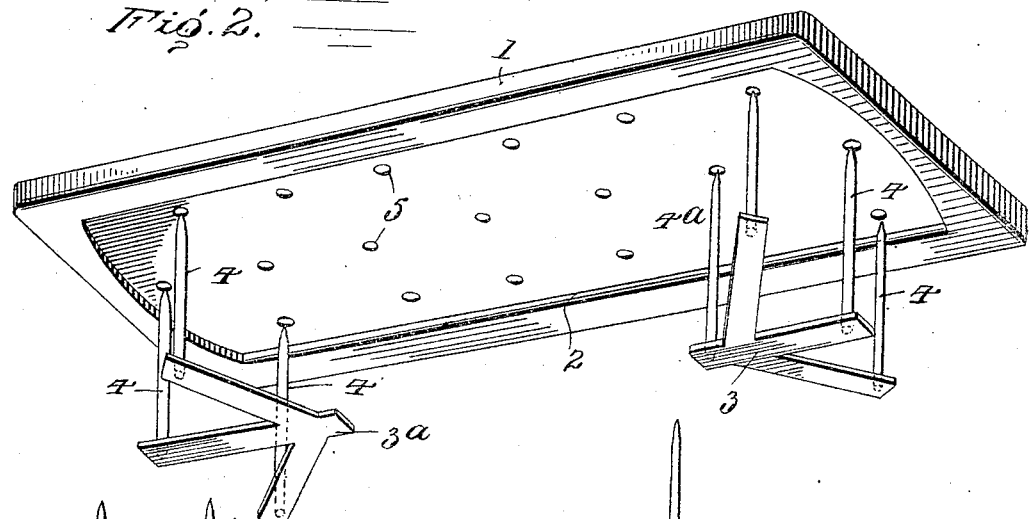
Figure 3:
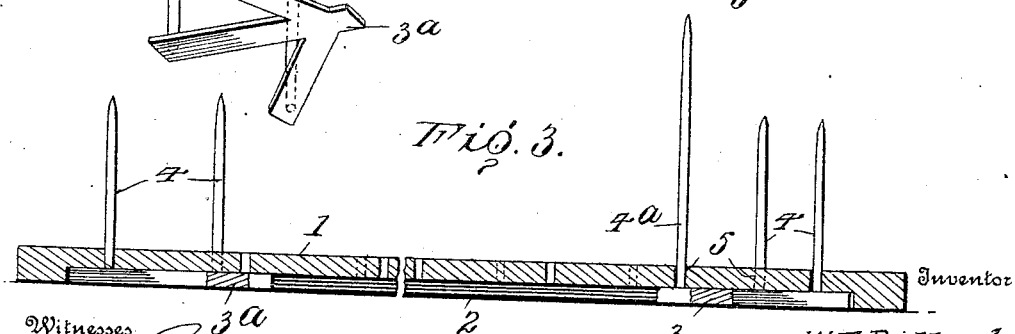

For a full understanding of the invention and the merits thereof, and to acquire a knowledge of the details of construction, reference is to be had to the following description and accompanying drawing, in which:

Figure 1 is a perspective view illustrating the application of my improved carving board; Fig. 2 is a perspective view of the carving board, showing the parts in juxtaposition; and, Fig. 3 is a longitudinal section thereof.

Corresponding and like parts are referred to in the following description and indicated in all the views of the drawing by the same reference characters.

My improved carving board embodies a preferably flat base 1 which is recessed in its lower face, as indicated at 2, so as to accommodate two frame-like holders 3 and 3ª which, in thickness, are less than or equal to the depth of the recess, so as to permit the carving board to rest firmly upon a supporting surface. Each of these holders is formed, in the present instance, with a plurality of diverging or branching arms that carry upwardly disposed retaining prongs 4, while the holder 3 is formed with an extra relatively large prong 4ª. These prongs are designed to be received in a plurality of perforations 5 extending through the base 1 and to be held frictionally therein, with their extremities projecting upwardly from the base, and arranged to be embedded in the meat or fowl to retain the same securely in position upon the base. The prong 4ª preferably projects upwardly from the base between the prongs 4 of the respective holders, so as to be embedded in the meat near the middle of the same. The number of perforations 5 in the base is greater than the total number of retaining prongs, so as to permit the holders to be shifted into different positions, to regulate the distance between the prongs, as may be desired, to render the carving board susceptible of use with pieces of meat of various sizes. It is to be understood that this carving board may be employed by itself, or may be placed in a platter.

While my improved device is designed primarily for use for carving purposes, it will be obvious that it may be advantageously employed in displaying fish or fowl or the like, as in restaurant windows.

From the above description, in connection with the accompanying drawing, it will be apparent that I have provided a simple, durable and efficient construction of device of the character described, which may be employed to effectually retain the meat in position during carving, which is susceptible of various other uses that will present themselves to those for whom the device is intended, and which consists of comparatively few parts that may be easily and cheaply manufactured and readily assembled.

Having thus described the invention, what I claim is:

A carving device of the character described, comprising a base formed with a recess in its lower face and with a plurality of openings extending therethrough in communication with the recess, separate holders accommodated in the recess and resting on the same supporting surface as the base, and sets of prongs carried by the holders and passing through the respective openings and projecting upwardly beyond the opposite face of the base, the prongs being retained frictionally in the openings, and the base being formed with a number of openings over and above the number of prongs, to admit of the sets of prongs being quickly shifted to vary the distance therebetween.

In testimony whereof I affix my signature in presence of two witnesses.

WILL E. BULLARD. [L. S.]

Witnesses:
W. C. RAMSAY,
D. L. CUPPETT.